United States Patent [19]

Ruzic

[11] 4,220,829
[45] Sep. 2, 1980

[54] TELEPHONE HANDSET

[75] Inventor: Hugo Ruzic, Leonberg, Fed. Rep. of Germany

[73] Assignee: International Standard Electric Corporation, New York, N.Y.

[21] Appl. No.: 11,017

[22] Filed: Feb. 9, 1979

[30] Foreign Application Priority Data

Feb. 17, 1978 [DE] Fed. Rep. of Germany ....... 2806744

[51] Int. Cl.² ...................... H04M 1/03; H04M 1/02; B65D 1/34
[52] U.S. Cl. .................................. 179/103; 179/179; 220/4 B
[58] Field of Search ............... 179/103, 179; 220/4 R, 220/4 B, 4 E

[56] References Cited

U.S. PATENT DOCUMENTS

| 2,686,834 | 8/1954 | Gottlieb | 179/103 |
| 2,720,332 | 10/1955 | Holt | 179/103 |
| 3,400,226 | 9/1968 | Krumreich et al. | 179/103 |
| 4,130,740 | 12/1978 | Cogan | 179/103 |
| 4,153,822 | 5/1979 | Veda et al. | 179/103 |
| 4,163,875 | 8/1979 | Cogan | 179/103 |

*Primary Examiner*—Daryl W. Cook
*Attorney, Agent, or Firm*—John T. O'Halloran; Jeffrey P. Morris

[57] ABSTRACT

The handset consists of two parts, i.e. of a smooth upper part and of a lower part including the two cap members accommodating the acoustic transducers (receiver and microphone capsules). The top part is connected to the lower part by means of bayonet joints. The parting-line surface of the upper part is curved more strongly than that of the lower part, thus causing the two parts to be held together under tension.

4 Claims, 2 Drawing Figures

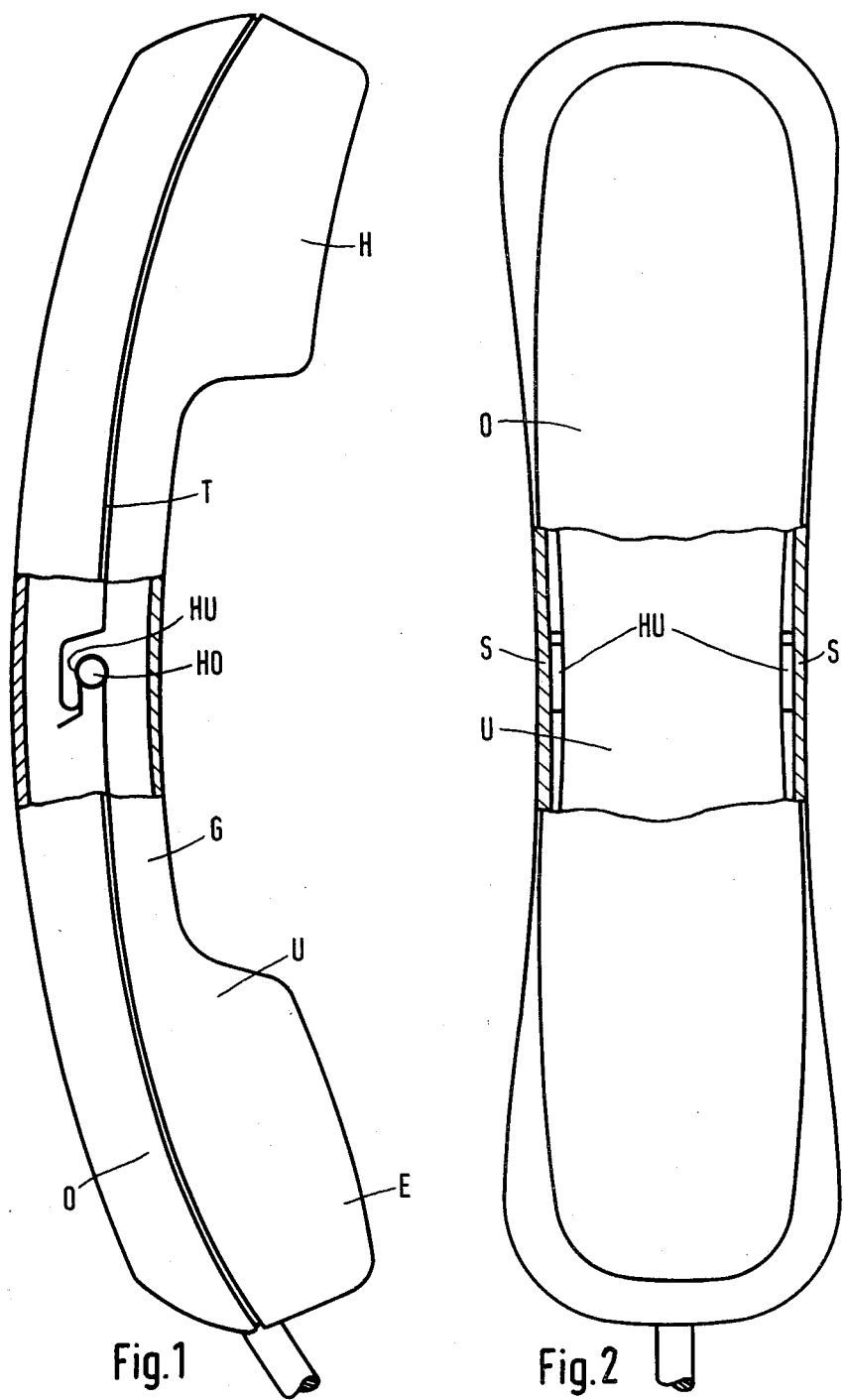

TELEPHONE HANDSET

The present invention relates a telephone handset according to the pre-characterizing clause of claim 1.

Telephone handsets composed of two housing parts are known. For connecting both parts various solutions have already been suggested. The German Pat. No. 957 232 relates to a handset having a housing which is divided in the longitudinal direction, with the upper part thereof including substantially the handle member and the capsule receptacles while the lower part forms the inside of the handle member as well as remaining segments in the receiver and microphone capsule receptacles. Both parts of the housing, after having been joined together, are connected by screwing on the capsule cover plates which, of course, form two further parts. Relatively high tooling costs are the consequence of this construction.

Another solution is proposed by the German Published Patent Application (DE-OS) No. 24 33 824, relating to a handset in which the capsule caps are integrated into the lower part of the housing, and are thus no longer required as separate parts. Anyway, this already means a saving in tooling costs. Both parts of the housing whose parting line extends almost in parallel with the outer contour of the upper housing part, are connected to one another with the aid of two screws which are screwed in from below. Owing to the compulsorily necessary moulding of the threaded bushes into the upper part of the housing, at least the tool for this purpose becomes again more expensive.

Assembly costs can be reduced by doing without the screwing when using the embodiment proposed by the German Published Patent Application (DE-OS) No. 23 58 602. Here the two parts of the housing are hinged at one end of the handset by nose members engaging behind each other, and are connected form- and forcelockingly (positively and non-positively) in the proximity of the other end by means of a wedge driven therein. In another embodiment, the wedge is replaced by an engaging hook moulded to the upper part of the housing, and engaging in a recess of the lower part thereof. For securing the engaging hook, the latter is acted upon by a spring clip. Finally, there is still proposed a more expensive embodiment according to which several engaging hooks are arranged at both ends of the handset, which are secured by helical springs and capable of being unlocked with the aid of angle sheet iron members.

Moreover, a handset has become known from the German Published Patent Application (DE-OS) No. 21 51 956 whose housing merely consists of two parts, i.e. the smooth upper part and the lower part containing the integrated capsule receptacles. There is done without separate mounting or fastening elements. The parting line extends in a curved manner in parallel with the outer contour of the upper part of the handset housing. Both parts are joined with the aid of several slide wedges moulded along the parting line on both longitudinal sides of the one part, for engaging in corresponding recesses provided for in the other part. When displacing the parts of the housing with respect to one another, the wedges run up in the recesses, thus wedging the two parts to one another. The wedge connections whose effect merely rests on friction, however, cannot offer the absolute guarantee as to that the two parts do not become loose under rough permanent operating conditions.

It is the object of the invention, therefore, to provide another way of connecting the two housing parts of a handset, doing without separate mounting or fastening members, which is as simple as possible, but very safe. This object is achieved by the features set forth in the characterizing part of claim 1. Advantageous further embodiments are set forth in the subclaims. The solution according to the invention offers the advantage that the tools can be made more simple and, consequently, are more inexpensive in manufacture than in the case of the conventional types of embodiment, and that, on the other hand, the quality of connection of the two parts of the handset, in spite of a more simple design, and owing to the very substantially higher friction, is much better than in the case of the well known wedge joint and, unlike this joint, is prevented from becoming loose on its own even when subjected to rough handling.

The invention will now be explained in greater detail with reference to an example of embodiment shown in FIGS. 1 and 2 of the accompanying drawings, in which:

FIG. 1 shows a handset according to the invention in a side view and partly in a sectional view, and FIG. 2 shows the same handset in a top view, partly sectionally.

FIGS. 1 and 2 show a telephone handset whose housing is composed of two parts, i.e. the upper part O and the lower part U. The continuous parting line T along which both parts are in contact with one another, extends in the longitudinal direction preferably on a regularly or irregularly bent surface, as is shown in FIG. 1. The curvature extends almost in parallel with the convex outer contour of the upper part O.

The upper part O is continuously provided with smooth outer surfaces while the lower part U is provided at both ends with the archings of the microphone cap E and the receiver cap H behind which, inside the housing of the handset, there are arranged the microphone or receiver capsules respectively. The two arched portions E and H are joined by the handle member G whose contour, in a side view, again extends almost in parallel with the outer contour of the upper part O (FIG. 1).

In the centre inside the handle member G, hook-shaped extensions HO and HU are moulded in a raised fashion to the two side-walls S as shown in FIG. 2, on the upper as well as on the lower part, with these hook-shaped extensions, in the assembled state, engaging behind one another as is shown in FIG. 1. The nose members of the hooks HO and HU extend almost in parallel with the parting-line surface T, so that by displacing the upper part O with respect to the lower part U, both parts can be either locked or unlocked.

The nose members of the hooks HO and/or HU may be additionally thickened to some extent, so as to effect an engagement. However, more important than this engaging effect, is that the radius of curvature of the parting line surface is smaller on the upper part O than that of the parting-line surface on the lower part U. In this way the two parts of the handset housing, during assembly, can only be positively (form-lockingly) linked with one another by exerting a corresponding force, and locked to one another by displacement with the aid of the hooks HO and HU. Owing to the tension then existing between the two parts of the handset housing O and U, the friction between the hooks HO and HU is so high that it is impossible for the connection to become loose on its own merely by using the handset.

As usual, the parts of the handset housing are made from a plastics material. In order to safeguard a tight sealing along the parting line, at least one part is provided with a stepped rim portion, i.e. in such a way that there will result a collar along the inside of the part, projecting into the other part of the handset housing.

What is claimed is:

1. A telephone handset consisting of a lower housing part comprising the caps for accommodating the receiver and microphone capsules, and of an upper housing part which are both connected to one another by a bayonet joint, and having a bent parting line extending between both parts in the longitudinal direction, characterized in that the radius of the parting line (T) of the upper part (O) of the housing is smaller than the radius of the parting line of the lower part (U) of the housing, and that in the centre, on each side-wall (S) of the housing parts there is provided one bayonet joint each.

2. A telephone handset as claimed in claim 1, characterized in that the bayonet joint is formed by two hooks (HO, HU) engaging into one another.

3. A telephone handset as claimed in claim 2, characterized in that said hooks (HO, HU) are provided with engaging members at their ends.

4. A telephone handset as claimed in claim 1, characterized in that at least one housing part (O, U) is provided with a stepping extending along the parting line (T) resulting in a tight closure when joined to the respective other part.

* * * * *